July 15, 1924.  
E. REZLER  
IMPLEMENT RAISING AND LOWERING MEANS  
Filed March 9, 1921
1,501,137
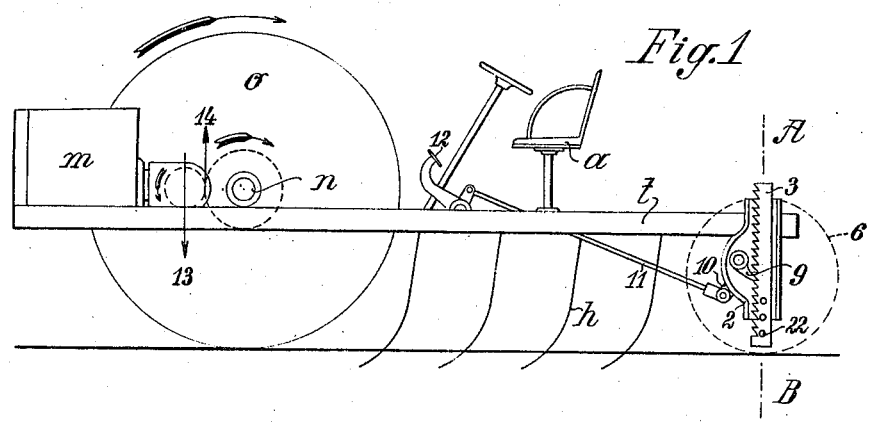
Fig.1
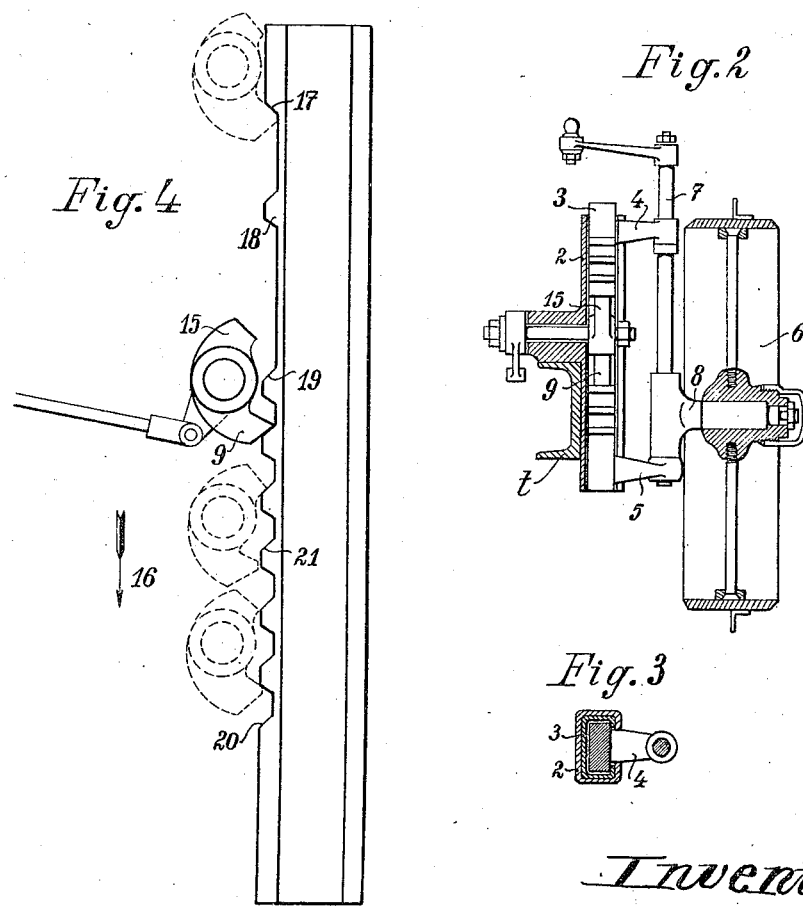
Fig.2
Fig.4
Fig.3
Inventor  
E. Rezler,  
By Marks & Clerk  
Attys.

Patented July 15, 1924.

1,501,137

UNITED STATES PATENT OFFICE.

EMIL REZLER, OF GUNGBUNZLAU, CZECHOSLOVAKIA.

IMPLEMENT RAISING AND LOWERING MEANS.

Application filed March 9, 1921. Serial No. 450,927.

(GRANTED UNDER THE PROVISIONS OF THE ACT OF MARCH 3, 1921, 41 STAT. L., 1313.)

*To all whom it may concern:*

Be it known that I, EMIL REZLER, citizen of the Czechoslovakian Republic, residing at Gungbunzlau, Czechoslovakia, have invented certain new and useful Improvements in Implement Raising and Lowering Means (for which I have filed applications in Austria, January 28, 1914; Hungary, July 17, 1917; Germany, June 14, 1920; France, June 29, 1920; Czechoslovakia, August 16, 1919; Poland, Jan. 17, 1920; Italy, Feb. 19, 1920; Belgium, March 17, 1920; and England, March 17, 1920), of which the following is a specification.

My invention relates to motor cultivators, in which an engine is adapted to drive a two-wheeled axle in either direction, by transmission means such as toothed gearing, and in which a share frame has its front end loosely hinged to the axle and its rear end connected, by means of adjustable and releasable devices, to a steering wheel. The invention has for its object to provide means for raising the share frame when the cultivator is to be turned round and for lowering the frame again as soon as the cultivator has arrived in working position. According to the invention the share frame has its weight so chosen and apportioned that the movements of the frame and of the steering wheel, with respect to the axle, tend, on the engine being reversed from front driving to rearward driving, to swing the share frame upwardly, while on the engine being reversed in the opposite direction, the movement of the frame alone and the weight of the same tends to swing the share frame downwardly; the connection between the steering wheel and the frame being released.

In the drawing, Fig. 1 is a diagrammatic side elevation of a cultivator embodying the invention. Figs. 2 and 3 show in vertical section, on line A B Fig. 1 and in horizontal section through Fig. 2, a modification of the construction. Fig. 4 shows on a larger scale the rack and pawls constructed according to the modification.

The share frame $t$ is supported by the front wheels O and the steering wheels 6. Its rear end carries a box 2 within which the rack 3 is guided in vertical direction. The rack 3 carries the bearings 4 and 5 of the vertical swinging shaft 7 to which is attached the horizontal axis 8 of the steering wheel 6. In the box 2 is pivoted a pawl 9 (Fig. 1) which may be operated by a crank 10 and the rod 11 under the action of the pedal 12 arranged in front of the driver's seat $a$. The rack 3 is provided with an abutting pin 22, which may be set according to the desired depth of the furrow and on which rests the box 2 during plowing. When the cultivator is to be turned round, and consequently the frame $t$ with the shares $h$ lifted, the driver sets the clutch so that the traction wheels are turned rearward. Thereby the reaction pressure of the tooth pressure acting upwardly, according to arrow 14, together with the reaction pressure in the direction of arrow 13 create a turning movement which tends to swing the share frame $t$ with the shares $h$ round the axis $n$ upwardly.

In order to operate with the aid of this turning movement the lifting of the share frame $t$, the weights of the frame and of the steering wheel 6 carrying the rack 3 are so arranged that, on the one hand, the sum of the weight moments of the share frame $t$ and the steering wheel 6, relatively to the front wheel axis $n$, is larger, and on the other hand, the weight moments of the share frame alone, relatively to the same axis, less than the turning moment of the reaction force of the engine $m$, which during the rearward drive acts upon the axis $n$ in the direction indicated by the arrow 13. Consequently the frame $t$ is only swung upwardly by the turning movement of the force of reaction, when its connection with the steering wheel 6 is out of gear.

When the share frame $t$ is to be lowered, the driver withdraws the pawl 9 by means of the pedal 12, thereby permitting the rear end of the frame $t$, by its own weight and by the turning moments now acting in the opposite direction, to move downward until the box 2 bears against the abutment 22 adjustable in the rack 3, whose position limits the depth of the furrows.

Consequently for altering the depth of the furrows with the described structure, the abutment 22 must be adjusted, which of course, cannot be done during plowing. By the modified construction, shown by Figs. 2, 3 and 4 the driver is enabled to alter the depth of the furrows during plowing. To this end, the pawl 9 is provided with a counter-pawl 15, Fig. 4, which, on the lowering of the share frame caused by the withdrawal of pawl 9, engages the next higher notch. During the downward movements (arrow 16) of the share frame, the counter-pawl 15 is by the tooth above it of the rack 3 forced out from the notch and thereby the pawl 9 is forcibly engaged in the next notch and further downward movement of the frame prevented. Consequent on this operation of the pawls 9 and 15, the share frame lowers only one tooth at each withdrawal of the pawl 9.

At the lifting of the share frame, caused by the reversing of the engine for rearward driving, the pawl 9 as well as the counter-pawl 15, integral with it, slide over all the teeth of the rack 3, till the movement is stopped by the abutting of the pawl 9 against the lateral face 17 of the uppermost notch (Fig. 4) and of the counter-pawl 15 against the full lateral face of the rack. The notch below the tooth 18 is considerably longer than all other notches. When the pawl 9 rests on the tooth 18, the shares are in their uppermost position, about 8 inches above the soil. The tooth 19 answers to that height of the shares, at which the same glide over the soil without plowing. Finally, the lowermost tooth 20 corresponds to the greatest depth of furrow provided for. If, for instance the frame be set for the depth of furrows corresponding to the tooth 21, the driver must, for lowering the share frame from the height corresponding to the tooth 21, four times press the pedal. However, a single release of the pawl 9 suffices for lowering the share frame $t$ from its uppermost position to the position corresponding to the tooth 19.

Having thus described my invention, what I claim is:

1. In a motor plow or cultivator, in combination, a plow frame, a two wheeled axle to which the front end is pivoted, a motor on the front end of the frame directly geared to the axle, a steering wheel, an adjustable and releasable connection between the steering wheel and the rear end of the frame, the position of the motor with respect to the wheeled axle being such that on the reversing of the motor from front driving to rearward driving the coaction existing between the moment of the motor and the moment of the reaction tooth pressure suffice to turn the frame upwardly a limited extent, while on reversing of the motor from rearward driving to front driving the moment of the frame alone suffices to return the frame downwardly.

2. An arrangement as claimed in claim 1 wherein stop means is provided to cooperate with the adjustable and releasable connection for limiting the raising movement of the frame so that the steering wheel will overcome the raising action at a predetermined time, substantially as and for the purposes set forth.

3. In a motor plow or cultivator, in combination, a plow frame, a two wheeled axle to which the front end of the frame is pivoted, a motor for the front end of the frame directly geared to the axle, a steering wheel, a box secured to the rear end of the frame, a rack guided in the box and associated with the steering wheel, a pawl in the box for fixing the rack and an adjustable abutment at the lower end of the rack for the box.

4. An arrangement as claimed in claim 1 wherein the adjustable and releasable connection comprises a box fixed to the rear end of the frame, a rack guided in the box and associated with the steering wheel, a double ended pawl journalled in the box for coacting with the teeth of the rack for regulating the position of the plow shares in the soil and the top portion of the rack corresponding to the highest position and to the position wherein the plough is sweeping over the soil without ploughing, having no teeth.

5. In a motor cultivator, in combination, a frame, a wheeled axle to which the forward end of the frame is pivoted, a motor mounted on the extreme forward end of the frame, a gearing directly connecting the motor with the axle plowshares depending from the rear portion of the frame, a box carried at the rear end of the frame, a rack guided in the box, a steering wheel hinged to the rack, a pawl journalled in the box for fixing the rack, an adjustable abutment at the lower end of the rack for the box for regulating the depth of the plowshares and manually operable means for actuating the pawl to release the rack, substantially as described and for the purpose set forth.

In testimony whereof I affix my signature.

EMIL REZLER.

Witnesses:
 JARY HAVLIK,
 JUSTAV BOHOIE.